United States Patent [19]

Spurlin

[11] Patent Number: 4,530,431

[45] Date of Patent: Jul. 23, 1985

[54] CENTER FLOW FEEDER AND VIBRATORY CONVEYOR

[75] Inventor: William V. Spurlin, Indiana, Pa.

[73] Assignee: Syn-Energy, Inc., Indiana, Pa.

[21] Appl. No.: 447,295

[22] Filed: Dec. 6, 1982

[51] Int. Cl.³ .............................................. B65G 27/32
[52] U.S. Cl. .................................. 198/534; 198/757; 222/199; 222/547
[58] Field of Search ............... 198/756, 757, 767, 770, 198/763, 766, 533, 534, 540, 761; 209/920; 222/199, 200, 547

[56] References Cited

U.S. PATENT DOCUMENTS

| | | | |
|---|---|---|---|
| 2,654,466 | 10/1953 | Spurlin | 198/763 |
| 2,658,609 | 11/1953 | Weyandt | 198/757 |
| 3,056,488 | 10/1962 | Musschoot | 198/763 |
| 3,173,583 | 3/1965 | Wahl | 222/199 |
| 3,178,068 | 4/1965 | Dumbaugh | 198/756 |
| 3,187,884 | 6/1965 | Carrier, Jr. | 198/757 |
| 3,258,111 | 6/1966 | Spurlin et al. | 198/757 |
| 3,261,508 | 7/1966 | Wahl | 222/199 |
| 3,703,236 | 11/1972 | Spurlin et al. | 198/766 |
| 3,744,676 | 7/1973 | Dumbaugh | 222/199 |
| 3,773,231 | 11/1973 | Wahl | 222/199 |
| 3,917,052 | 11/1975 | Burgess, Jr. | 198/757 |
| 3,971,493 | 7/1976 | Williams | 222/199 |
| 4,131,193 | 12/1978 | Musschoot | 198/533 |
| 4,218,929 | 8/1980 | Spurlin | 198/770 |
| 4,285,447 | 8/1981 | Fairbank | 222/200 |

FOREIGN PATENT DOCUMENTS

| | | | |
|---|---|---|---|
| 709237 | 5/1965 | Canada | 198/533 |
| 2504832 | 8/1975 | Fed. Rep. of Germany | 222/200 |
| 122562 | 9/1979 | Japan | 198/763 |
| 48315 | 5/1981 | Japan | 198/767 |
| 62108 | 4/1982 | Japan | 198/763 |
| 79-00453 | 7/1979 | World Intel. Prop. Org. | 198/770 |
| 1359324 | 7/1974 | United Kingdom | 222/199 |

Primary Examiner—Joseph E. Valenza
Assistant Examiner—Daniel R. Alexander
Attorney, Agent, or Firm—Charles L. Lovercheck; Wayne L. Lovercheck; Dale R. Lovercheck

[57] ABSTRACT

A torsional vibrating device is disclosed for operation as a two mass vibrating system consisting of a first mass having a generally circular work member and a spring mechanism connecting the first mass to the second mass excited by a motor driven eccentric weight or weights so that the second mass vibrates in a circular path having a circular component and a vertical component which will cause material on said work member to be conveyed in a circular direction. The spring member is unique in this combination. The entire system is isolated from the supporting means. This system has application for controlling the flow of bulk material from a hopper, screen or feeder or for elevating or lowering a material in a helical trough or for orientation of discrete particles or other applications depending on a properly designed work member.

17 Claims, 16 Drawing Figures

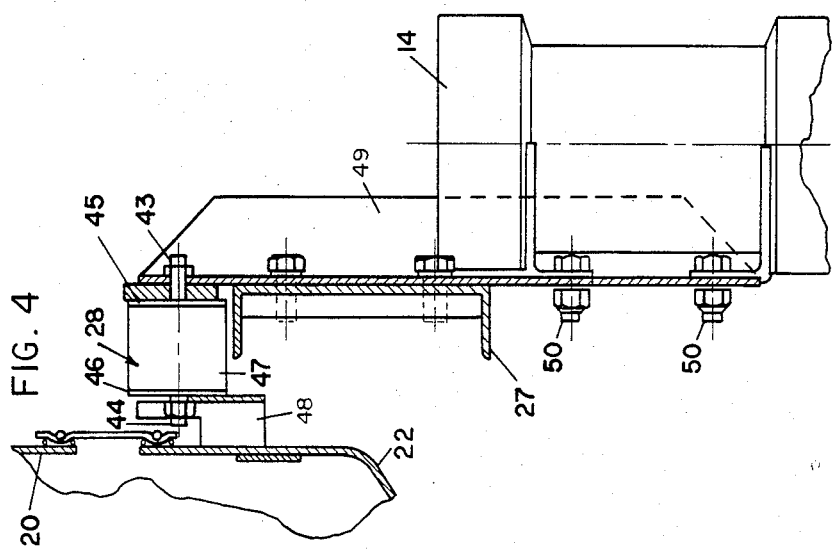
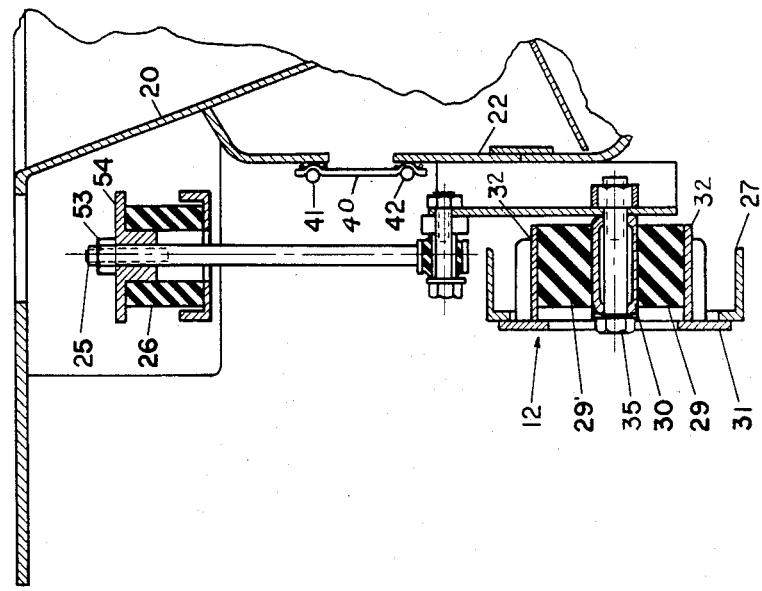

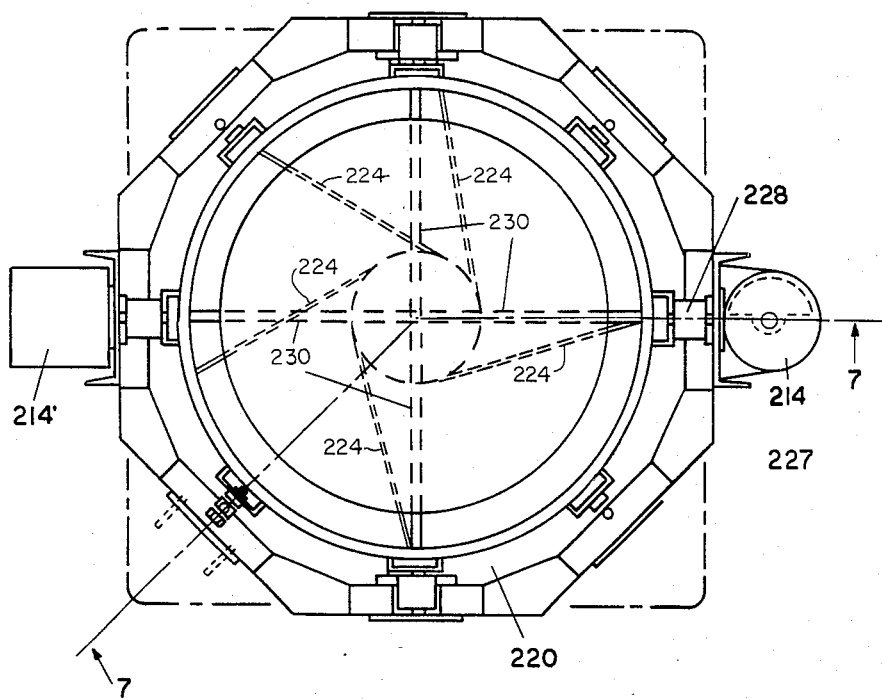

CENTER FLOW FEEDER AND VIBRATORY CONVEYOR

BACKGROUND OF INVENTION

Field of Invention

The present invention relates generally to vibratory material handling equipment such as circular vibratory bowl feeders, screens, spiral conveyors, elevators and the like. More particularly, the invention relates to a vibratory device operable as a two mass vibratory system which oscillates in a circular path.

There are many examples of suspension systems for circular vibratory conveyors sometimes referred to as bowl feeders, spiral conveyors and screens which are in commercial use and in the patented art. The suspension system in the combination constitutes a substantial improvement over the prior art.

REFERENCE TO THE PRIOR ART

Applicant's own U.S. Pat. No. 4,218,929 discloses a vibratory device having a first mass and a second mass supported on the first mass by means of springs and a vibrator supported on the second mass for vibrating the work member in translation. Applicant is further aware of the patents referred to in the said United States Patent. None of these Patents disclose a vibratory device which operates in a circular path.

GENERAL DESCRIPTION OF INVENTION

A torsional vibrating devices is disclosed operating as a two mass vibrating system consisting of a first means (work member) spring connected to the second mass (base) and excited by motor driven eccentric weight or weights. The entire system is isolated from its supporting structure by coil springs or rubber blocks. Operating frequency of the system is always below the natural frequency of the two mass system.

The torsional vibration direction with a vertical vibration component will cause material to be conveyed in a circular direction. This system has application for controlling flow of bulk material from hoppers, size separation on circular screens, elevating or lowering material on helical troughs and orientation of discrete particles.

SUMMARY OF INVENTION

The invention disclosed herein involves a vibratory device for driving work members used in bowl feeders, screens, spiral conveyors, and other vibratory devices for handling bulk material and discrete parts which operate as a two mass vibrating system. A variable speed motor driven eccentric weight exciter attached to a frame is employed forming one mass and a work member forming a second mass. The two masses are spring coupled to transmit the vibratory energy generated by the exciter to the second mass.

The improvement over the prior art disclosed herein centers around the spring suspension in combination with a helical conveyor such as a center flow feeder, a screen, a helical conveyor, or a bowl feeder.

The spring coupling between the two masses is adjustable in a generally vertical cylindrical path to vary the direction of the application of the exciter forces transmitted from the first mass to the second mass. This adjustability of the spring coupling enables fixing the direction of application of the exciter forces as well as the adjustable speed motor as called for by conditions of use. Particular specific accelerations of the conveying surface are required and it is desirable to be able to adjust the velocity and direction of movement of the conveyor. Thus the adjustability of the spring coupling offers great flexibility in providing vibratory equipment which can be adjusted after the original installation and for the conditions of a particular job.

OBJECTS OF THE INVENTION

It is an object of the invention to provide a vibratory device operable as a two mass vibrating system wherein the resilient support coupling for the two masses of the system is adjustable to vary the direction of application of the exciter forces generated on one mass and transmitted through the resilient coupling to the second mass where the masses are isolated from the support at its location of use to eliminate transmitting vibrations to the support. The vibratory device oscillates through a circular path.

It is another object of the invention to provide a vibratory device as disclosed herein wherein the adjustable resilient coupling is disposed at the sides of the vibratory device being thereby readily accessible for adjustment as required.

Another object of the invention is to provide a vibratory device which vibrates in a cylindrical path incorporating a work member which can easily be adjusted after installation to improve the operation thereof.

Another object of the invention is to provide a vibratory center flow feeder that is simple in construction, economical to manufacture, and simple and efficient to use.

Another object of the invention is to provide a vibratory circular screen that is simple in construction, economical to manufacture, and simple and efficient to use.

Another object of the invention is to provide a vibratory bowl feeder that is simple in construction, economical to manufacture, and simple and efficient to use.

Another object of the invention is to provide a helical conveyor that is simple in construction, economical to manufacture, and simple and efficient to use.

With the above and other objects in view, the present invention consists of the combination and arrangement of parts hereinafer more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF DRAWINGS

FIG. 3 is an enlarged partial cross sectional view of a part of FIGS. 1 and 2 taken on line 2—2 of FIG. 1.

FIG. 4 is an enlarged partial cross sectional view of another part of FIGS. 1 and 2 taken on line 2—2 of FIG. 1.

FIG. 16 is a top view of the feeder shown in FIG. 7.

DETAILED DESCRIPTION OF THE DRAWINGS

Figure 1:
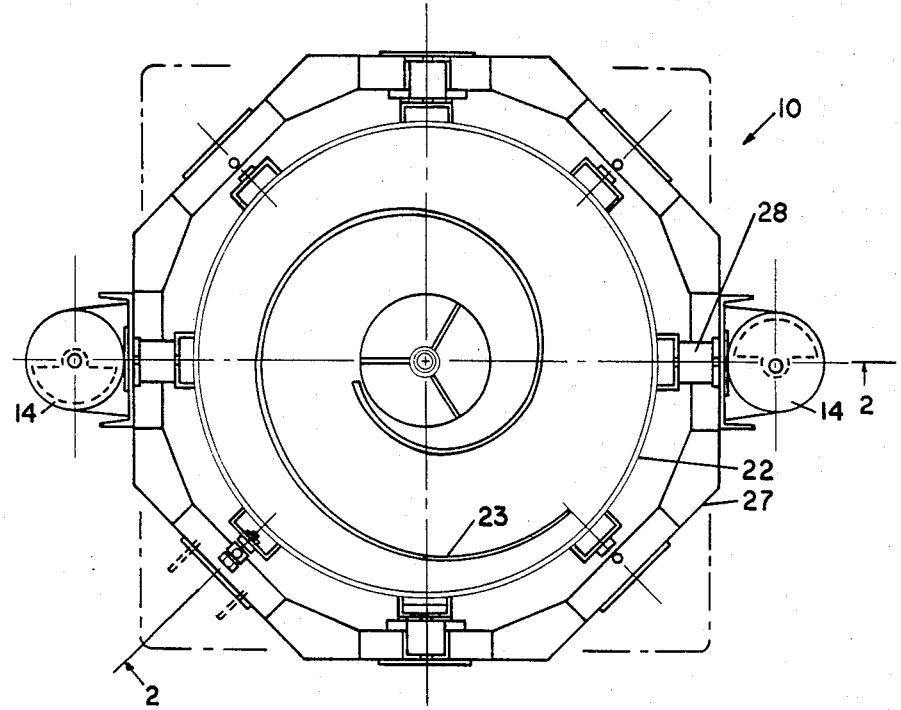
FIG. 1 is a cross sectional view taken on line 1—1 of FIG. 2 of a center flow feeder.
Figure 2:
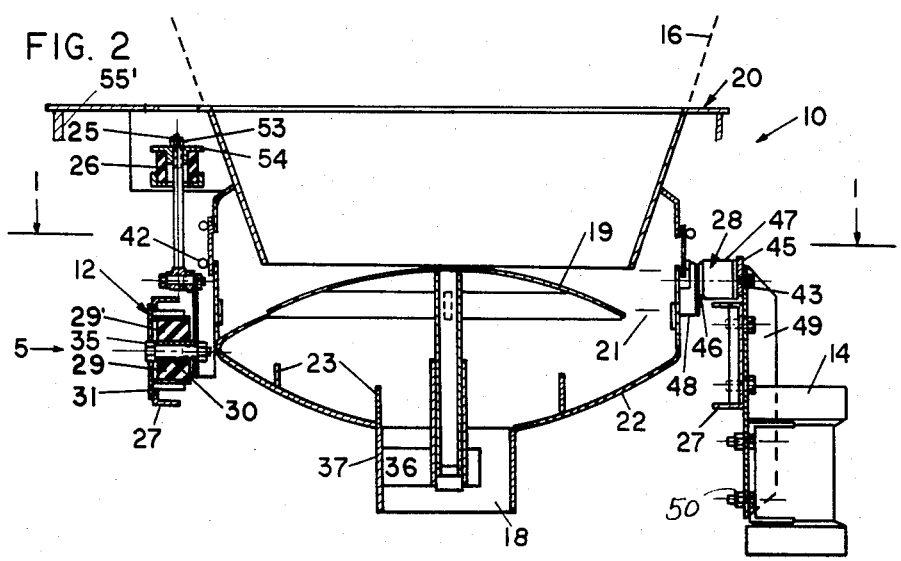
FIG. 2 is a cross-sectional view taken on line 2—2 of FIG. 1.
Figure 5:
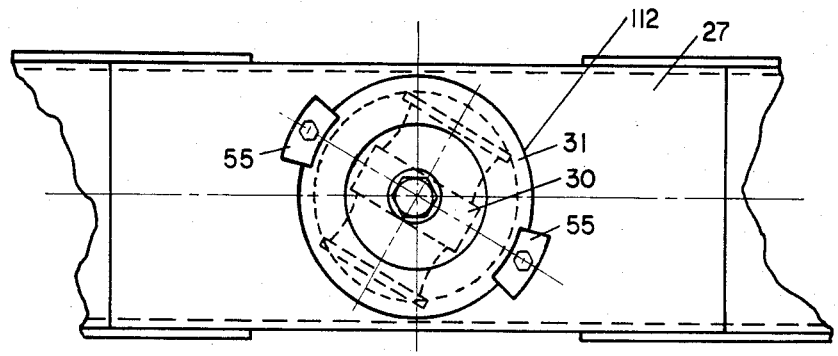
FIG. 5 is an enlarged partial view of FIG. 2 in the direction of the arrow 5 in FIG. 2.

Now, with more particular reference to the drawings, the center flow feeder 10 shown in the drawings, FIGS. 1 and 2, and by way of example has a conical member 20 adapted to be attached to a hopper indicated at 16. The conical member 20 has an opening 18 large enough to insure free flow of bulk material to the opening small enough to handle the required flow rate and to provide a means to vary the rate of discharge at 18 to suit the application.

The cone 20 is attached to the lower end of bin or hopper 16 which may be of a hopper of familiar configuration. The domed head 19 is in the form of a convex disc which has a convex top and is supported on bracket 36 which is attached to the discharge member 37 which is cylindrical in shape. The domed head 19 acts as a plug for the discharge opening from the cone 20 to tray 22 and also acts as an agitator for the bulk material flowing from the cone causing the bulk material to move down through cone 20 and through the adjustable gate opening 21 passing through trough 22 which is supported on the frame 31 by spring assembly 12 and feeding in a spiral direction around spiral track 23 to discharge opening 18, directed by spiral wall 23 to center discharge opening 18 at a generally uniform rate. The gate opening 21 is adjusted by raising and lowering the tray by means of support rods 25 which pass through resilient isolators 26 and have nuts 53 that rest on washers 54 by means of which the hopper and cone can be raised or lowered to adjust the size of discharge opening 21.

The first mass of the two mass vibrating system consists of the tray 22 connected to the second mass or frame 27 by means of a plurality of coupling spring assemblies 12. The frame is excited by the two eccentric weight motors or rotary vibrators 14 which are fixed to the frame 27. At opposite sides from each other, the vibrators have two weights that rotate in the same direction therefore the vibrators will operate 180° out of phase with each other to produce only torsional forces. The feeder may be suspended by supports 49 or the frame 27 could be supported on resilient means, for example like supports 126 in FIG. 6.

The cone 20 is connected to tray 22 by flexible sheet 40 held to cone 20 by wire hoop 41 and held to tray 22 by wire hoop 42 in a conventional manner to prevent escape of material.

The vibrator 14 which is shown by way of example as an eccentric weight motor and frame 27 are supported on the cone 20 by means of isolation springs 26. Auxiliary springs 28 utilize relatively resilient rubber preloaded in compression operating in shear direction to insure that natural frequency of the system is lower in torsion than the natural frequency in a lateral direction. Auxiliary spring 28 has bolts 43 fixed to discs 45 and 46 respectively which are attached to studs which are bonded to rubber cylinder 47. Discs 46 are clamped to angles 48 which is fixed to the tray and discs 45 are clamped to bracket 49. Vibrators 14 are clamped to angles 49 by studs 50. The use of single eccentric weight vibrators 14 balanced by weight on the opposite side may be used when a slight orbital action of the trough 22 is permissible. Also a belt driven eccentric shaft weight from a separate motor may be substituted for the eccentric weight motors 14.

The rate of flow of material is controlled by varying the speed of the eccentric weight motors 14 for example by means of a variable frequency power supply which changes the stroke of trough 22 by reducing the operating frequency relative to the natural frequency of the two mass systems.

Figure 8:
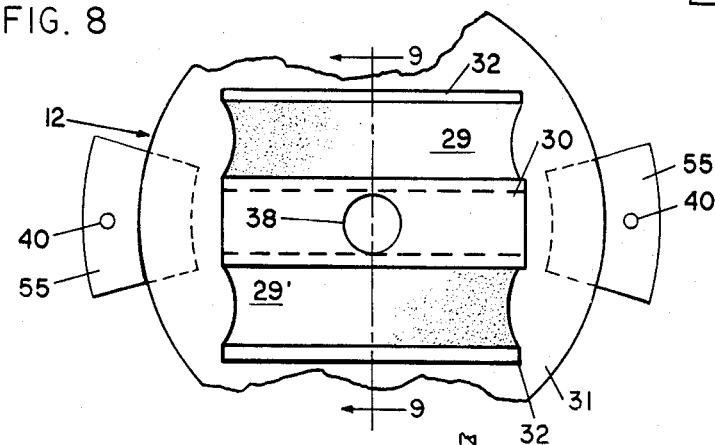
FIG. 8 is a partial side view of the suspension spring according to the invention.
Figure 9:
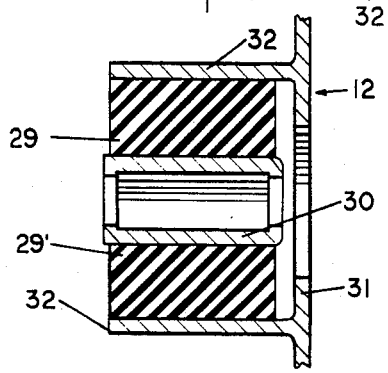
FIG. 9 is a cross sectional view taken on line 9—9 of FIG. 8.

The enlarged views of coupling spring assemblies 12 are shown in FIGS. 8 and 9. They consist of two elongated polyisoprene blocks 29 and 29' compressed and thus preloaded between elongated center block 30 and elongated outside platelike outer members 32. Outer members 32 each have a side edge fixed to disc 31. The center block 30 is connected to trough 22 by bolt 35 received in hole 38 and frame 27 is connected to frame 27.

Blocks 29 and 29' are bonded to elongated inner block 30 and to elongated outer members 32. Disc 31 is fixed to outer members 32 and lugs 55 which receive studs in holes 40 and lock the disc 31 in adjusted position to the frame 27. The disc 31 can be rotated when lugs 55 are released on bolts in holes 40 to change the direction of the path of movement of the trough 22. Thus, the spring assembly is positioned and clamped in such a manner as to provide angular adjustment of the operating angles of the spring assemblies 12 which operate in the shear direction to obtain the optimum feed angle to suit the material being conveyed.

To adjust the angle of the spring, the spring assembly 12 is rotated on bolt 35 and clamped by bolts in the hole 40 and bolt 35 in holes 38 at the desired position to provide the desired operating angle which is in shear direction to obtain the optimum feed direction and characteristics of the stroke of trough 22.

The shape of trough 22 can be changed in accordance with the requirements of the particular application and good design practice. FIGS. 1 and 2 show a feeder with a conical shaped trough with slope angle to suit wet sticky bulk material.

Figure 7:
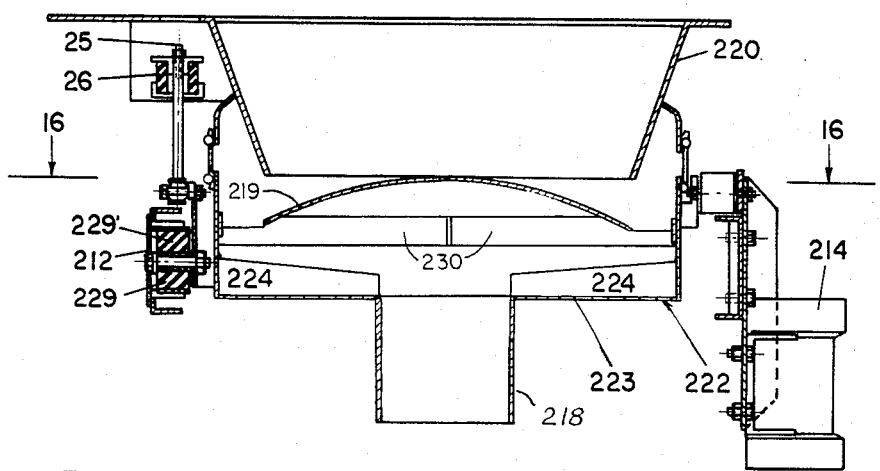
FIG. 7 is a cross sectional view of a vibratory screen with a flat bottom.

A center flow feeder with a flat bottom is shown in FIGS. 7 and 16. Tray 222 has a flat botton 223 otherwise the feeder shown in FIG. 7 and FIG. 16 is similar to the feeder shown in FIGS. 1 and 2. The flat bottom feeder has springs 212 and single eccentric weight vibrators 214 at one side and a counterweight 214' of equal weight at the other side of the feeder. Load support domed head 219 is supported on cross arms 230 and the outer ends of cross arms 230 are fixed to the inner periphery of the tray. The flat bottom supports the radial deflectors 224 to direct bulk material to central discharge 218. The flat bottom 223 is suitable for handling free flowing materials.

Circular Screen

Figure 6:
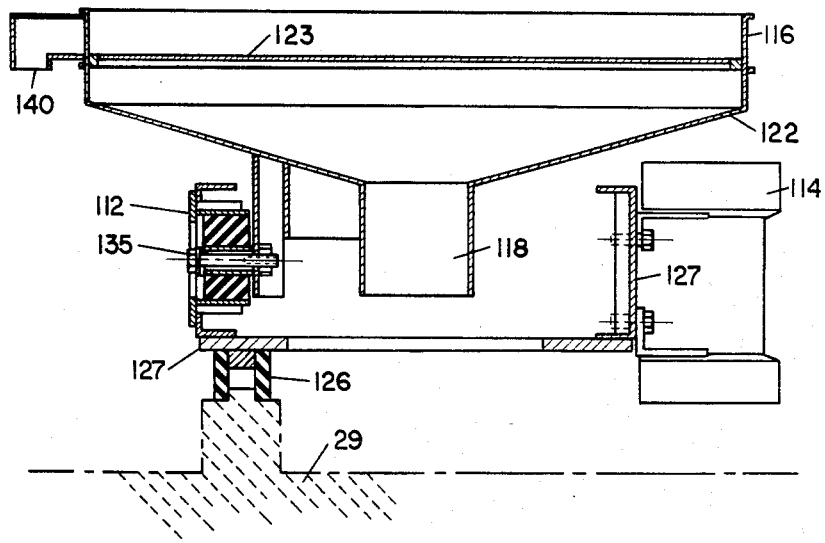
FIG. 6 is a cross sectional view of a circular screen with a single vibratory energy source and a counterweight.

A circular screen separator is shown in FIG. 6. The circular screen separator has tray 122 and screen 123 which may have suitable mesh size depending on the material being handled supported on frame 127 by spring assembly 112 identical to the spring assembly 12 in FIGS. 1, 2, 8 and 9. The base design may be the same as in FIGS. 1 and 2 except that a single weight vibrator 5 and counterweight may be used.

Small particles fall through the screen 123 and are discharged at 118. A side discharge 140 for large particles is provided. In the case of the screen, one motor drive with eccentric weight 114 and a counterweight will be satisfactory. An advantage of this design is that the vertical stroke relative to the horizontal stroke may be set at optimum value by means of adjusting the angle of coupling spring assembly 112 by adjusting the position of the lugs 55 to suit separation requirements of the bulk material.

Bowl Feeder

Figure 10:
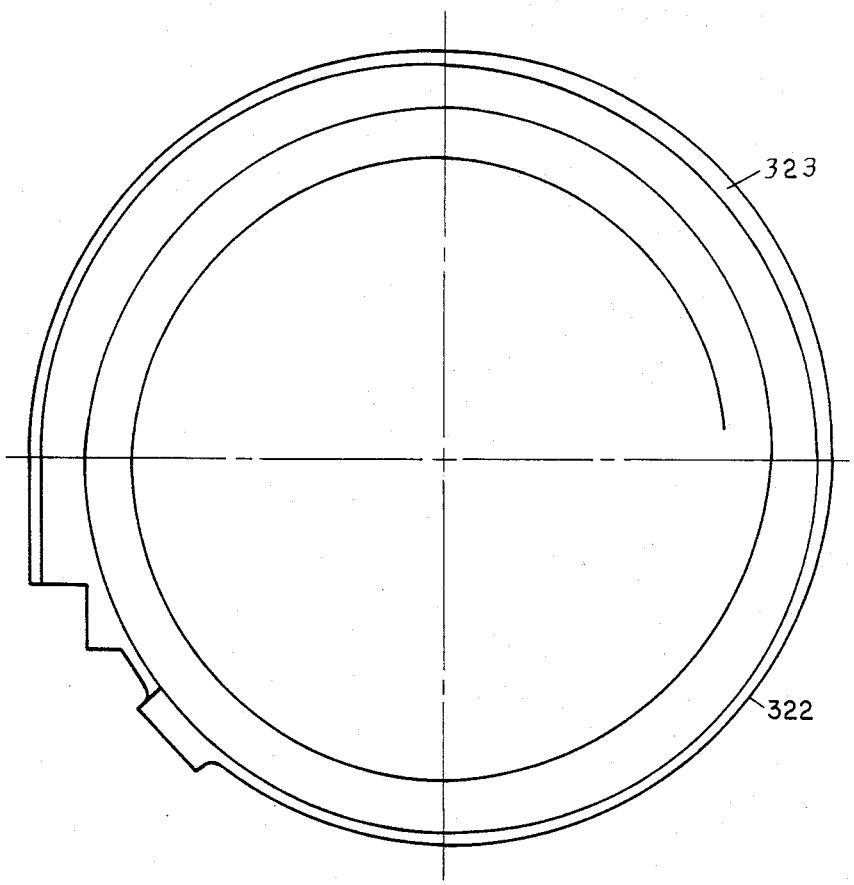
FIG. 10 is a top view of a vibratory bowl feeder.

A bowl feeder is shown in FIGS. 10, andd 12-14. A bowl feeder is a device for feeding discrete parts from a bulk mass of parts placed in the hopper or bowl in a single line and in an oriented position. This is accomplished by means of a helical spiral track 323 inside the bowl 322 using orienting devices such as profile in track, slots, rails, risers, wipers, and the like to suit the particular shape or profile of the parts to be handled. The springs supporting the bowl are similar to springs 212 in the preceding embodiment which are excited by a two motor drive 314 with eccentric weights identical to the springs and eccentric weights and motor drive utilized in the embodiment of FIGS. 1 through 8. The eccentric weight motors 214 are oppositely positioned and are driven in the same direction of rotation which produces an alternating torsional force which is extremely effective in the operation of a parts feeder.

By means of the spring assembly 312, the angle of vibration can be set to optimum position to produce the orientation and feed rate required by the application.

Since this is a two mass vibration system as in FIGS. 1 and 2, the bowl stroke can be adjusted by varying the speed of the motor driven eccentric by means of a suitable speed control on the motor thereby adjusting the feed rate to suit the requirements of the application.

The upwardly extending spiral side track 323 carries parts to discharge opening 325.

Helical Trough Elevator

Figure 11:
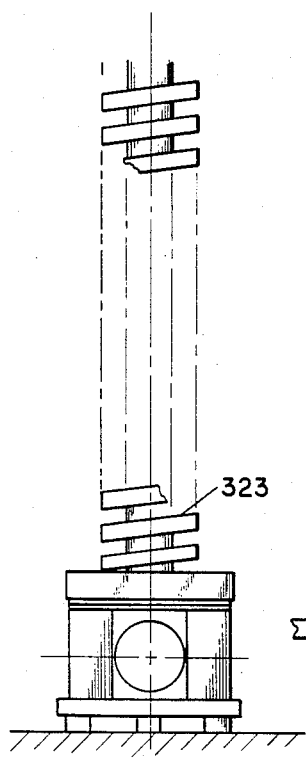
FIG. 11 is a side view of a helical conveyor.
Figure 15:
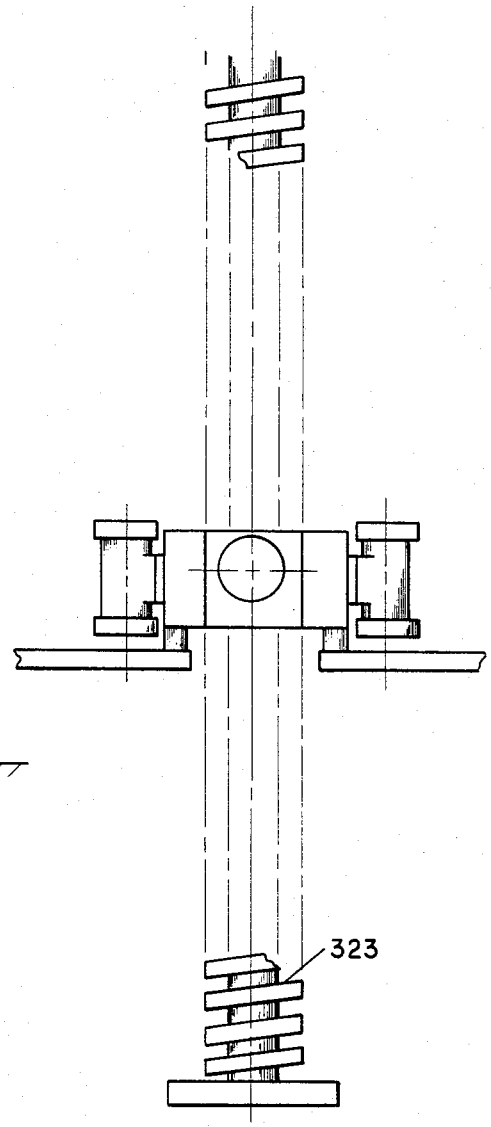
FIG. 15 is a view of the conveyor of FIG. 11.

The bowl of the parts feeder or the cone of the center flow feeder could be replaced with a helical track such as shown in FIGS. 11 and 15. The elevator can then be used for elevating or lowering bulk material. Such an elevator also has applications in heating, cooling or drying of bulk materials.

Figure 12:
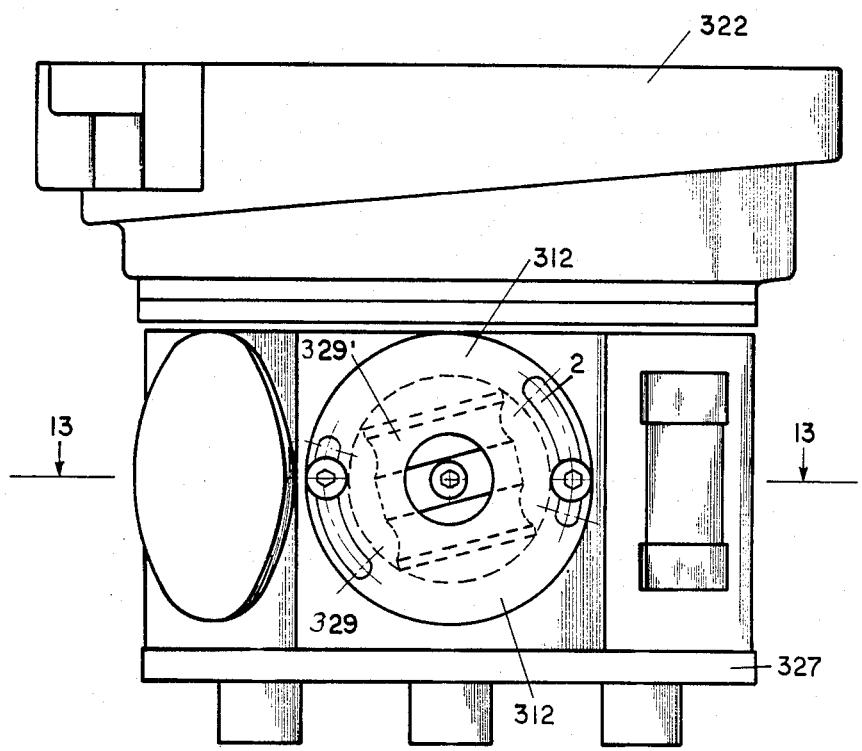
FIG. 12 is a side view of the feeder of FIG. 10.
Figure 13:
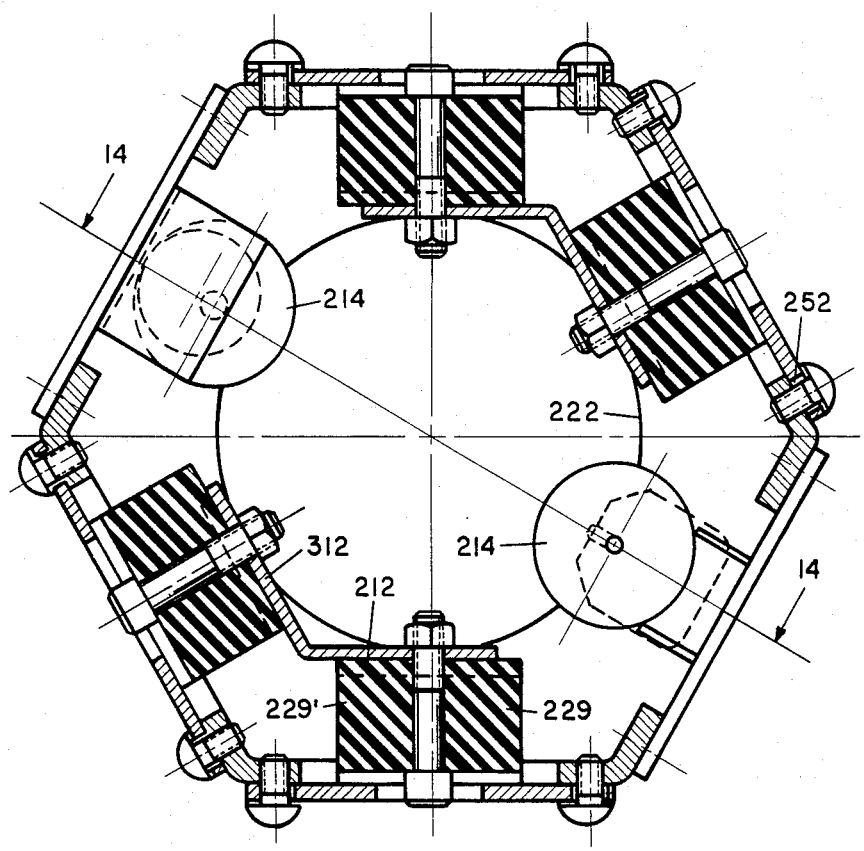
FIG. 13 is a cross sectional view taken on line 13—13 of FIG. 12.
Figure 14:
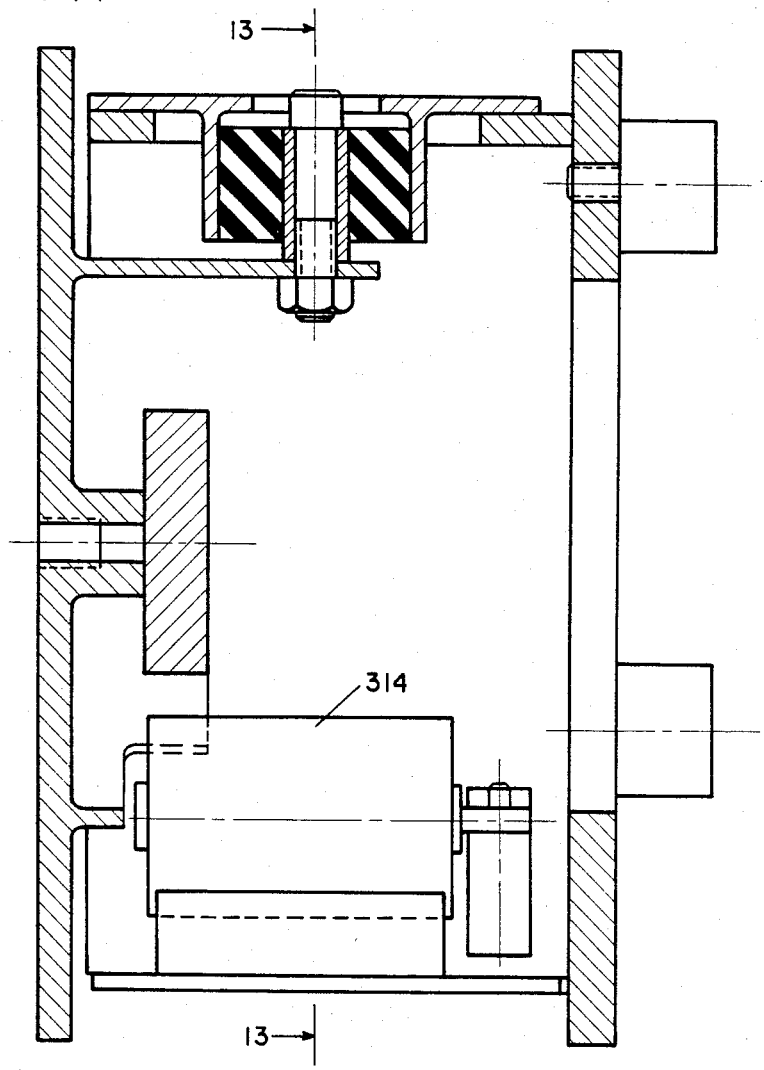
FIG. 14 is a cross sectional view taken on line 14—14 of FIG. 13.

In all of these embodiments, the base can be constructed where applicable in accordance with that shown in FIGS. 12, 13 andd 14. In these figures, the adjustable springs 212 are like those of the other embodiments.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A center flow feeder comprising in combination,
a frame,
a circular tray having a bottom, a side, a wall and a discharge opening in said bottom,
a hopper,
a vibrator,
said hopper having a central bottom outlet opening,
said tray being supported below said outlet opening,
means in said tray to move material to said discharge opening comprising an upwardly extending spiral wall supported therein and leading from the outer periphery of said tray toward the center thereof,
a circular head supported on said tray and spaced from said hopper outlet opening for providing a space between said hopper and said head for material to be moved from said outlet opening to said tray,
flexible means supporting said tray on said hopper,
flexible means supporting said tray on said frame,
vibration transmitting spring means connecting said tray and said frame,
said vibrator being supported on said frame whereby said vibrator vibrates said frame moving said tray and said head relative to said hopper whereby material from said hopper and is agitated and moved into said tray and to said discharge opening.

2. The center flow feeder recited in claim 1 wherein said circular head has a upwardly facing convex surface supported below said bottom outlet opening in said hopper.

3. The center flow feeder recited in claim 1 wherein said support means for supporting said tray on said hopper has means to adjust said tray toward and away from said hopper to increase and decrease the size of the opening between said head and said hopper.

4. The center flow feeder recited in claim 3 wherein said tray has an upper edge,
said upper edge is attached to said hopper by flexible attaching means.

5. The center flow feeder recited in claim 4 wherein said flexible means supporting said tray on said hopper comprises a vertically extending elongated rod,
said elongated rod has an upper end and a lower end,
said lower end being pivotly connected to said frame,
said upper end of said rod having washer means thereon,
a resilient sleeve supported on said tray,
said washer means resting on said resilient sleeve whereby said tray is supported.

6. The center flow feeder recited in claim 1 wherein said vibrator is a variable frequency vibrator adapted to change the frequency of the tray relative to the frequency of vibration of the hopper.

7. The apparatus recited in claim 1 wherein said vibration transmitting spring means comprises a first elongated member fixed to said first mass and a second elongated rigid member fixed to said second mass and elongated resilient means bonded to said first elongated member and to said second elongated member whereby said second means is moved in a circular path with a vertical component, said elongated members being disposed generally tangentially to said circular work member and inclined to the vertical.

8. The apparatus recited in claim 7 wherein a plurality of said spring means are disposed in circumferential spaced relation on said base connecting said first mass to said second mass.

9. The apparatus recited in claim 8 wherein means is provided for adjusting the angle of incline of said elongated members.

10. The apparatus recited in claim 1 wherein said vibration transmitting means comprises assemblies spaced from each other coupling said frame to said tray,
  each said assembly having means to be angularly adjusted in a generally vertical plane relative to said frame to change the vertical component of vibration relative to the horizontal.

11. The apparatus recited in claim 10 wherein said tray has a concave bottom.

12. The apparatus recited in claim 1 wherein each of said vibration transmitting spring means comprises elongated rigid outer members and an elongated rigid inner member between said outer members,
  said vibration transmitting springs being disposed in compression between said outer and inner members,
  said outer and inner members being generally aligned with said direction of application of the exciter forces to transmit said vibratory energy to said work member in shear of said vibration transmitting resilient means.

13. The apparatus recited in claim 12 wherein said vibration tranmitting springs comprise a material having the properties of rubber.

14. The apparatus recited in claim 13 wherein said material is bonded to said outer and inner members.

15. The apparatus recited in claim 9 wherein fastening means is provided for locking said spring means in fixed angular position relative to said frame whereby the angle of path of movement of said elongated members is changed.

16. The apparatus recited in claim 9 wherein said vibration transmitting springs comprise rubber blocks in compression between said members of each said assembly with said rubber being bonded to each of said members within each said assembly and said first member is connected to said first mass and said second members are fixed to said second mass.

17. The apparatus recited in claim 12 wherein said vibrator comprises a rotary eccentric weight exciter.

* * * * *